April 3, 1956  D. W. RYKER ET AL  2,740,692
MANUFACTURE OF HYDRAZINE
Filed June 19, 1950
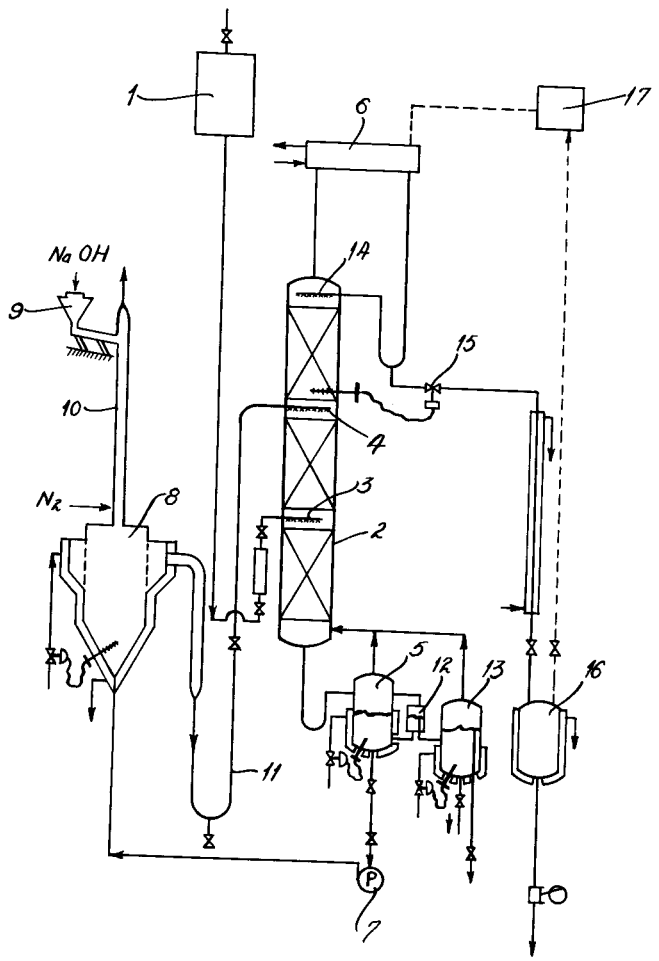
INVENTORS:
DON W. RYKER
OSCAR J. SWENSON
BY Bruinger and Sutherland
ATTORNEYS.

United States Patent Office 2,740,692
Patented Apr. 3, 1956

2,740,692

MANUFACTURE OF HYDRAZINE

Don W. Ryker, Alton, and Oscar J. Swenson, Crystal Lake, Ill., assignors to Olin Mathieson Chemical Corporation, a corporation of Virginia Application June 19, 1950, Serial No. 168,968

10 Claims. (Cl. 23—190)

This invention relates generally to the manufacture of hydrazine, and particularly to a process of dehydrating a hydrazine hydrate so as to produce hydrazine in any desired concentration.

In the process of manufacturing hydrazine, it is customary to produce hydrazine hydrate, which is then dehydrated. In order to obtain substantially anhydrous hydrazine, that is, of 95% concentration or greater, it has heretofore been necessary to subject the crude aqueous hydrazine solution to fractional distillation in order to raise the concentration of the hydrazine to about 51% to 64%, which is equivalent to about 80% to 100% hydrazine hydrate. Since hydrazine and water form a constant boiling mixture, about 64% concentration is the maximum obtainable by ordinary fractional distillation methods. Accordingly, a dehydrating agent, i. e., a substance having an affinity for water, such as sodium hydroxide, calcium oxide, barium oxide, or the like, is utilized to further dehydrate the hydrazine solution.

The chemical dehydration of hydrazine-water mixtures has heretofore been proposed, but continuous processes for accomplishing such dehydration have not heretofore been feasible or practical, and such high concentration hydrazine as has heretofore been produced has been attended by the production of copious quantities of hydrazine solutions of low concentration.

It is, therefore, the object of this invention to provide an economical process of producing hydrazine in any desired concentration, and particularly substantially anhydrous hydrazine. A further object of the invention is to provide a continuous process of dehydrating hydrazine solutions with no appreciable yield of low concentration hydrazine. Other objects will become apparent to those skilled in the art from the following disclosures:

In accordance with the present invention, generally stated, a hydrazine hydrate solution of any convenient concentration may be produced by any known process.

Given such a crude hydrazine solution, the invention contemplates contacting the solution with a solution of dehydrating agent, such as sodium hydroxide, which latter solution is substantially saturated with hydrazine, and which contains dehydrating agent in such excess that each molecule of water to be removed from the crude hydrazine solution is provided with its molecular requirements of dehydrating agent—in case it is desired to produce substantially anhydrous hydrazine with caustic soda as the dehydrator, at least one mol of caustic is used to each mol of water which it is desired to remove from the crude hydrazine solution. In contacting the crude hydrazine solution with the caustic solution, the invention contemplates that the contact take place in a vessel through which vapors from the distillation of crude hydrazine solution are passing in countercurrent relation to the inflow of streams of caustic (in solution or suspension in water saturated with hydrazine) and crude hydrazine solution. In the vessel aforesaid, the vapors contact the incoming dehydrator solution before the latter contacts the incoming crude hydrazine solution and consequently the affinity of the excess dehydrator in the dehydrator solution is availed of to dehydrate the vapors. From the aforesaid vessel, the mixture of dehydrator solution and crude hydrazine solution passes to a boiler which, when operated under negative pressure sufficient to boil the mixture in the range of 60° C. to 80° C., produces vapors rich in hydrazine. These vapors are then returned to the vessel aforesaid in countercurrent relation to the incoming streams. Some of the bottoms from the boiler (which consist of a solution saturated with hydrazine and containing sodium hydroxide monohydrate) are then removed from the boiler, fortified with additional sodium hydroxide sufficient to dehydrate another increment of crude hydrazine solution, and returned through the vessel first mentioned. The process is, therefore, continuous and the amount of dehydrator introduced at each refortification of the bottoms from the boiler will control the concentration of the hydrazine distillate so that, if desired, the entire yield of distillate may be substantially anhydrous. The excess of sodium hydroxide monohydrate solution may be stripped of residual hydrazine, producing vapors less rich in hydrazine than those produced from the boiler aforesaid, but which, when mixed with the vapors from the boiler, may be dehydrated concomitantly to produce substantially anhydrous hydrazine, if desired.

Referring now to the accompanying drawing, which is a flow sheet representing the several steps in the process of the present invention, the crude hydrazine solution, which may have a hydrazine concentration in the range of 25% to 64%, is delivered from a source 1 into a vessel 2. The vessel 2 is a column containing a suitable packing whereby separately introduced sprays of different liquids may be intimately contacted one with the other. The crude hydrazine solution is introduced into the vessel 2 through a spray head 3.

Concurrently with the introduction of crude hydrazine solution into the vessel 2, caustic solution, which is preferably already saturated with hydrazine, is introduced through a spray head 4 located substantially above spray head 3. The caustic solution preferably contains on the order of one mol or more of caustic soda for each mol of water in the solution which is introduced at spray head 4, as well as at spray head 3.

In the section of column 2 below spray head 3, the solutions become intimately mixed and the excess caustic soda introduced at spray head 4 becomes hydrated. From the bottom of column 2, the mixture of solutions is discharged into a boiler 5 which, when maintained at a temperature of about 75° C. and at a pressure of about 120 millimeters of mercury, will boil off vapors which are rich in hydrazine and contain but little water. These vapors are returned to the bottom of column 2, where they pass upwardly through the downflowing streams of solutions. In the portion of column 2 between spray head 3 and spray head 4, the rising hydrazine-rich vapors are contacted with caustic solution and the caustic soda being in excess depletes the vapors of their water content. The vapors pass upwardly from the top of column 2 to a condenser 6.

The bottoms remaining in boiler 5, or at least part of them, are discharged from the boiler 5 and delivered by pump 7 to a caustic dissolver 8. The dissolver 8 is a jacketed vessel suitably heated in order to expedite the solution of the sodium hydroxide in the liquors. The dissolver 8 is provided with fresh sodium hydroxide from a source 9 which is delivered into the vessel 8 through a deaerating column 10. Nitrogen is passed upwardly through the column 10 in amount sufficient to deaerate the stream of solid caustic being fed downwardly therethrough.

After being fortified with fresh sodium hydroxide in the dissolver 8, the caustic solution from boiler 5, which is saturated with hydrazine, is delivered to column 2 through spray head 4. Between dissolver 8 and spray head 4, a barometric leg 11 is provided in order to maintain the apparatus on one side thereof, namely, the column 2 and boiler 5, under pressure substantially below that of dissolver 8, which latter may be operated at atmospheric pressure.

In the operation of the system above described, with continued input of crude hydrazine solution and continued input of fresh caustic soda, the volume of caustic solution in the system continuously increases. Accordingly, a portion thereof is continuously withdrawn from the boiler 5 through a liquid level device 12 (which controls the level of liquid in boiler 5) and deposited in stripper 13. The stripper 13 is maintained at a temperature higher than that of boiler 5 and, for example, in the range of 110° C. to 140° C. In the stripper 13, the hydrazine-water vapors evolved are relatively lean in hydrazine but, nonetheless, these vapors are introduced in the bottom of column 2 along with the hydrazine-rich vapors from boiler 5, and are subjected to the same dehydrating action to which the vapors from bottom 5 are subjected, as above described. The bottoms from stripper 13, which consist of a rich solution of sodium hydroxide in water with only a trace of hydrazine, may be utilized as desired.

In the embodiment illustrated in the drawing, the column 2 extends substantially above spray head 4 so as to provide a region for the refluxing of condensate from condenser 6. Where it is desired so to reflux the condensate, the same is delivered into the column 2 through a spray head 14. The amount of condensate thus refluxed at any time may be controlled by a valve 15 located in the discharge line between condenser 6 and collecting vessel 16.

In order to maintain the vapor system composed of column 2, boiler 5, stripper 13, collecting vessel 16, and condenser 6 under sub-atmospheric pressure sufficient to accomplish the vaporization in boiler 5 at temperatures on the order of 60° C. to 80° C., the several interconnecting elements of the vapor system are connected to a suitable evacuating device 17.

In a typical operation, the crude hydrazine solution supplied from tank 1 may be approximately a 47% solution of hydrazine hydrate in water delivered through spray head 3 at the rate of about 83.5 pounds per hour. The caustic solution delivered through spray head 4 may consist of approximately 1,351 pounds of sodium hydroxide in 585 pounds of water containing about 59 pounds of hydrazine, and delivered at the rate of in the neighborhood of 1,995 pounds per hour. Boiler 5 operates at a temperature of 75° C. and at a pressure of 120 millimeters, supplying hydrazine-rich vapors to column 2. The bottoms from boiler 5, consisting of 1,221 pounds of sodium hydroxide, 59 pounds of hydrazine, and 585 pounds of water, are returned to dissolver 8 at the rate of 1,865 pounds per hour, and in dissolver 8 such bottoms are fortified by the addition of 130 pounds of solid sodium hydroxide per hour. Concurrently, part of the bottoms from boiler 5, having the composition above indicated, are delivered into stripper 13 at the rate of 198.5 pounds per hour, and the vapors evolved in stripper 13 are composed of 50% hydrazine and 50% water, being evolved at the rate of 10 pounds per hour. In the operation carried out under the conditions above mentioned, 95% hydrazine is collected in collector 16 at the rate of 25 pounds per hour. In the example just given, the caustic content of the solution delivered at spray head 4 is sufficient to provide one molecule of sodium hydroxide for each molecule of water in the system. Such conditions will consistently yield substantially anhydrous hydrazine as the condensate, but it will be understood that, when the final product is desired to be of lower concentration, then a smaller amount of sodium hydroxide is introduced per increment of time at dissolver 8. While reference has been made to sodium hydroxide as the dehydrating agent, it is not to be understood that the invention is limited to the use of sodium hydroxide as the dehydrator. On the contrary, other compounds, such as potassium hydroxide, which have preferential affinity for water and may be carried into the dehydrating system dissolved in hydrazine solution, may be used in lieu of the sodium hydroxide mentioned.

From the foregoing description, those skilled in the art should readily understand that the invention accomplishes its objects and provides a continuous process of dehydrating crude hydrazine solution whereby the concentration of the final product may be varied over wide limits. While a detailed disclosure of one embodiment of the invention has been provided, it is realized that those skilled in the art may make modifications in and adaptations of the particular equipment described, and it is, therefore, to be distinctly understood that the invention is not limited to the details of the foregoing disclosure. On the contrary, such variations, modifications, and adaptations as present themselves to those skilled in the art without departing from the spirit of the invention are contemplated within the scope of the appended claims.

Having thus described the invention, what is claimed and desired to be secured by Letters Patent is:

1. In the art of dehydrating aqueous hydrazine solutions, the process which comprises, injecting a sodium hydroxide-water mixture into a vessel in which it is distributed and flows downwardly, vaporizing the hydrazine solution and injecting it into said vessel below the locus of injection of said sodium hydroxide solution, passing the vapors upwardly through the vessel in contact with the down-flowing sodium hydroxide-water mixture, the sodium hydroxide-water mixture at the time of injection containing at least one mol of sodium hydroxide for each mol of water, and recovering dehydrated aqueous hydrazine above said locus of injection.

2. In the art of dehydrating hydrazine hydrate, the process which comprises, preparing a flowable mixture of sodium hydroxide and water wherein the mol content of sodium hydroxide at least equals the mol content of water, vaporizing hydrazine hydrate, flowing the sodium hydroxide-water mixture into a vessel, passing the hydrazine hydrate vapors in contact with the sodium hydroxide-water mixture in said vessel to at least partially dehydrate the vapors, and recovering the dehydrated vapors after they have contacted the sodium hydroxide-water mixture.

3. The process of claim 2 in which the water-caustic solution is saturated with hydrazine.

4. In the art of dehydrating aqueous hydrazine solutions, the process which comprises, continuously flowing downwardly in a dehydrating vessel a spray of a water-caustic solution containing at least one mol of caustic alkali for each mol of water, concurrently spraying weak hydrazine solution to be dehydrated into said vessel at a point substantially below the source of the spray flow of the caustic-water solution so that the sprayed solutions become intimately intermixed, discharging the mixture of sprayed solutions into a boiler where hydrazine-rich vapors having little water content are evolved, passing said vapors upwardly through continuously added spray streams of fresh water-caustic solution and relatively weak hydrazine solution; and subsequently recovering and condensing the hydrazine-rich vapors.

5. The process of claim 4 in which the water-caustic solution is saturated with hydrazine.

6. The process of claim 4 wherein the pressure on the interior of the boiler is substantially less than atmospheric.

7. In the art of dehydrating aqueous hydrazine solutions, the process which comprises, continuously flowing downwardly in a dehydrating vessel a spray of a water-caustic solution containing at least one mol of caustic alkali for each mol of water, concurrently spraying weak hydrazine solution to be dehydrated into said vessel at a point substantially below the source of the spray flow of the caustic-water solution so that the sprayed solutions become intimately intermixed, discharging the mixture of sprayed solutions into a boiler where hydrazine-rich vapors are evolved, and passing said vapors upwardly through the spray stream of water-caustic solution, said vapors during at least part of said passage contacting the water-caustic solution before the latter has contacted said weak hydrazine solution.

8. In the art of dehydrating aqueous hydrazine solutions, the process which comprises, continuously injecting into and dispersing in a dehydrating vessel a water-caustic solution containing at least one mol of caustic alkali for each mol of water, concurrently introducing into and dispersing in said vessel a weak hydrazine solution so that the solutions become intimately intermixed, discharging the intermixed solutions into a boiler where hydrazine-rich vapors are evolved, the locus of introduction of said weak hydrazine solution being substantially removed from the locus of introduction of said water-caustic solution and between the latter locus and the locus of discharge for said intermixed solutions, introducing said vapors into said vessel and passing the same in contact with the dispersed water-caustic solution before the latter becomes intermixed with said weak hydrazine solution to reduce the water content of said vapors, and subsequently collecting and recovering the hydrazine-rich vapors of reduced water content.

9. The process of claim 8 in which the water-caustic solution is saturated with hydrazine.

10. The process of claim 8 in which at least part of the unvaporized content of the boiler is discharged therefrom, fortified with caustic alkali to an extent such as to provide at least one mol of caustic alkali for each mol of water therein and reinjected into said vessel.

References Cited in the file of this patent

FOREIGN PATENTS

| | | |
|---|---|---|
| 22,957 | Great Britain | A. D. 1907 |
| 139 | Great Britain | A. D. 1908 |

OTHER REFERENCES

"The Chemistry of Hydrazine," by Audrieth and Ogg, 1951 ed., pages 48–51 and foot-note original source in page 54. John Wiley and Sons, Inc., N. Y.

Raschig: Berichte, vol. 43 (1910), page 1927.

Hale and Shetterley: "Journal of the American Chemical Society," vol. 33, part II, pages 1071–1076.

"The Chemistry of Hydrazine," page 3746, by Audrieth and Mohr, Chem. and Eng. News, vol. 26, No. 50, December 13, 1948.

Mellor's "A Comprehensive Treatise on Inorganic and Theoretical Chemistry," page 310 of vol. 8, 1928 ed., Longmans, Green and Co., N. Y.